(12) United States Patent
Firat et al.

(10) Patent No.: US 10,186,928 B2
(45) Date of Patent: Jan. 22, 2019

(54) ELECTRIC MOTOR WITH A THERMAL SWITCH POSITIONED AT A DISTANCE FROM A STATOR FOR HOUSEHOLD APPLIANCES

(71) Applicant: Arcelik Anonim Sirketi, Istanbul (TR)

(72) Inventors: Asuman Firat, Istanbul (TR); Cihad Ekin, Istanbul (TR); Huseyin Orhan, Istanbul (TR); Emin Gultekin Sonmez, Istanbul (TR); Yakup Imat, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 119 days.

(21) Appl. No.: 14/370,027

(22) PCT Filed: Dec. 21, 2012

(86) PCT No.: PCT/EP2012/076583
§ 371 (c)(1),
(2) Date: Jun. 30, 2014

(87) PCT Pub. No.: WO2013/098228
PCT Pub. Date: Jul. 4, 2013

(65) Prior Publication Data
US 2015/0137635 A1    May 21, 2015

(30) Foreign Application Priority Data
Dec. 29, 2011 (TR) .............................. a 2011 13236

(51) Int. Cl.
*H02K 11/00* (2016.01)
*H02K 5/22* (2006.01)
(Continued)

(52) U.S. Cl.
CPC .............. *H02K 5/225* (2013.01); *H02K 3/522* (2013.01); *H02K 5/22* (2013.01); *H02K 11/25* (2016.01); *H02K 11/27* (2016.01); *H02H 5/048* (2013.01)

(58) Field of Classification Search
CPC ........ H02K 11/25; H02K 11/225; H02H 5/00; H02H 5/048; H02H 5/047; H02H 5/225;
(Continued)

(56) References Cited

U.S. PATENT DOCUMENTS

| 4,112,405 A | 9/1978 | Joseph |
| 4,523,798 A * | 6/1985 | Barrows ................ H01R 31/06 439/685 |

(Continued)

FOREIGN PATENT DOCUMENTS

| CN | 1141528 A | 1/1997 |
| CN | 1358061 A | 7/2002 |

(Continued)

OTHER PUBLICATIONS

International Search Report of PCT/EP2012/076583 and the references cited therein.

(Continued)

*Primary Examiner* — Bernard Rojas
*Assistant Examiner* — Maged Almawri
(74) *Attorney, Agent, or Firm* — Kilpatrick Townsend & Stockton LLP

(57) ABSTRACT

The present invention relates to an electric motor used in household appliances such as washing machines, comprising a rotor, a stator, more than one winding the diameter and coil number of which are determined according to the desired power and the number of revolutions, more than one terminal to which the winding ends are connected, a connector wherein the terminals are situated, fixed on the stator (Continued)

Figure 1:
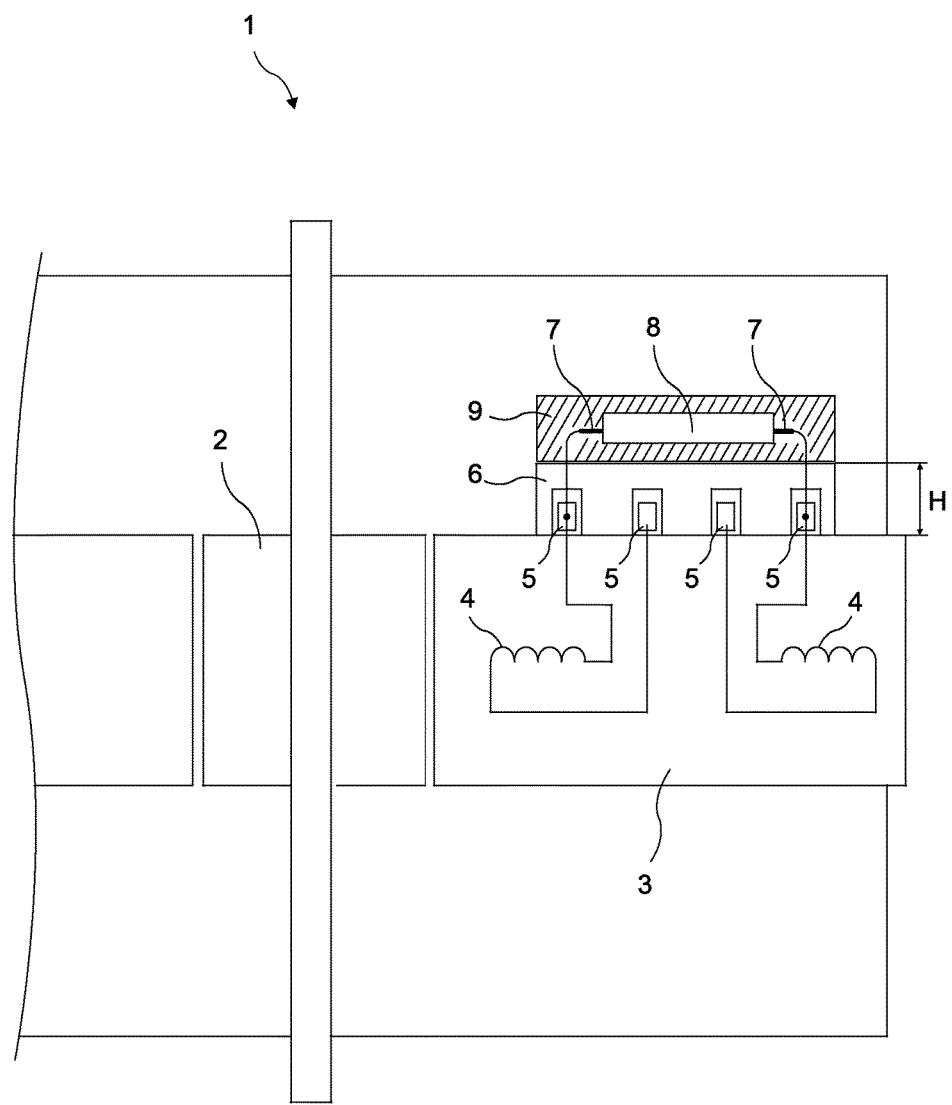

and which provides the electrical connection between the windings and the external power source and a thermal switch connected in series to the windings, which cuts off the electric current passing therethrough and stops the operation of the electric motor by detecting the increase in the current that occurs due to reasons such as excessive load and mains voltage variability.

18 Claims, 6 Drawing Sheets

(51) Int. Cl.
  *H02K 3/52* (2006.01)
  *H02K 11/25* (2016.01)
  *H02K 11/27* (2016.01)
  *H02H 5/04* (2006.01)

(58) Field of Classification Search
  CPC .... H02H 11/25; H02H 11/27; H02H 11/0047; H02H 5/22; H02H 5/522
  USPC .................. 310/71, 68 C; 318/783; 361/816
  See application file for complete search history.

(56) References Cited

U.S. PATENT DOCUMENTS

| | | | |
|---|---|---|---|
| 4,716,326 A * | 12/1987 | Fisher | H01H 1/26 310/68 E |
| 4,791,329 A * | 12/1988 | Ubukata | F04B 39/127 310/68 C |
| 4,926,081 A * | 5/1990 | Diflora | H01R 4/2462 310/68 C |
| 5,129,843 A * | 7/1992 | Bowsky | H01R 13/521 439/181 |
| 5,463,522 A | 10/1995 | Van Wagener et al. | |
| 5,515,217 A * | 5/1996 | Higashikata | H01H 37/5436 361/103 |
| 6,326,879 B1 * | 12/2001 | Hangmann | H01H 37/043 310/68 C |
| 6,665,196 B2 * | 12/2003 | Jang | F04B 39/12 361/753 |
| 7,038,570 B2 | 5/2006 | McMichael et al. | |
| 7,484,992 B2 * | 2/2009 | Boischio | H02K 5/225 310/71 |
| 7,531,926 B2 * | 5/2009 | Jones | H02K 11/25 310/68 C |
| 8,076,813 B2 * | 12/2011 | Hussey | H02K 11/25 310/179 |
| 2001/0048285 A1 * | 12/2001 | Furukawa | F04B 35/04 318/783 |
| 2007/0194643 A1 | 8/2007 | Jones | |
| 2008/0022597 A1 | 1/2008 | Boischio | |
| 2015/0015103 A1 * | 1/2015 | Isoda | B60K 11/06 310/71 |

FOREIGN PATENT DOCUMENTS

| | | |
|---|---|---|
| CN | 1096737 C | 12/2002 |
| CN | 201699540 U | 1/2011 |
| DE | 3807832 A1 | 10/1988 |
| DE | 10251928 A1 | 6/2004 |
| EP | 0029328 A1 | 5/1981 |
| EP | 0548610 A1 | 6/1993 |
| GB | 2330954 A | 5/1999 |
| JP | H07222403 A | 8/1995 |

OTHER PUBLICATIONS

Written Opinion of the International Search Authority for PCT/EP2012/076583and the references cited therein.

\* cited by examiner

ELECTRIC MOTOR WITH A THERMAL SWITCH POSITIONED AT A DISTANCE FROM A STATOR FOR HOUSEHOLD APPLIANCES

The present invention relates to an electric motor which comprises a thermal switch that cuts off the current conduction by detecting overheating due to high electric current.

In electric motors used in household appliances, for example washing machines, thermal switches are used against high current and overheating that occur due to reasons such as excessive load and variable mains voltage. When the temperature of the electric motor exceeds a certain limit value, the thermal switch stops the operation of the motor by cutting off the electric current conduction. The thermal switch is connected in series to the windings disposed in the stator in the electric motor and is situated on the motor. In various embodiments, the self heating thermal switch of overcurrent protection type is used in electric motors for protection from high value currents. In this type of thermal switches, a resistance is disposed which heats up as a result of the excessive increase in the electric current. The thermal switch rapidly detects the heating up of the electric motor in cases such as excessive load by means of the resistance the thermal switch comprises depending on the electric current drawn from the mains and thus protects the electric motor by cutting off the current before the overheating of the electric motor. The thermal switch is generally situated on the stator stack or on the stator windings in electric motors; however, the hot air circulation and the magnetic field generated in the stator adversely affect the operation of the thermal switch.

In the U.S. Pat. No. 6,326,879, a synchronous single-phase electric motor is explained wherein thermal switch is used.

In the Japanese Patent Application No. JP7222403, a stator is explained whereon thermal protector is situated.

The aim of the present invention is the realization of an electric motor comprising a thermal switch which cuts off the current conduction by detecting overheating due to high electric current and which is prevented from being affected by the magnetic field generated in the stator.

The electric motor realized in order to attain the aim of the present invention, explicated in the first claim and the respective claims thereof is suitable for using in household appliances such as washing machines and comprises a thermal switch which cuts off the electric current that passes therethrough by detecting the rise in the current that occurs due to reasons such as excessive load and variability of the mains voltage and a housing produced from heat insulating material, encapsulating the thermal switch and which is situated on the connector disposed on the stator. The thermal switch is positioned away from the stator as much as at least the height of the connector, thermal insulation is provided and the thermal switch is prevented from being affected by the magnetic field.

In an embodiment of the present invention, the housing is produced in two pieces. The first part has a receptacle wherein the thermal switch is situated, and is mounted to the second part seated on the connector after the thermal switch is situated therein.

In another embodiment of the present invention, the first part and the second part that form the housing are joined by the snap-fitting method.

In another embodiment of the present invention, the housing covers and protects the connector against external factors such as humidity, dust etc.

In another embodiment of the present invention, the connection ends of the thermal switch are joined with the stator winding ends by means of the terminals disposed in the connector.

In another embodiment of the present invention, the connection ends that are disposed on both sides of the thermal switch are joined with the winding ends by means of the terminals on the head portion and the end portion of the connector.

In another embodiment of the present invention, the cables that connect the connection ends of the thermal switch to the terminals are concealed by being passed through the housing.

In another embodiment of the present invention, the connection ends of the thermal switch are connected to the terminals by means of two pins that are passed through the housing.

In another embodiment of the present invention, the connection ends of the thermal switch are connected to the terminals by means of a PCB situated in the housing.

In the electric motor of the present invention, the thermal switch is situated in a heat insulating housing and is not affected by the hot air circulation that occurs during the operation of the electric motor. By the housing being situated on the connector, the thermal switch is provided to be moved away from the stator and the thermal switch is not affected by the magnetic field on the stator and thus prevented from stopping the electric motor unnecessarily.

The electric motor realized in order to attain the aim of the present invention is illustrated in the attached claims, where:

FIG. 1—is the schematic view of an electric motor.

Figure 2:
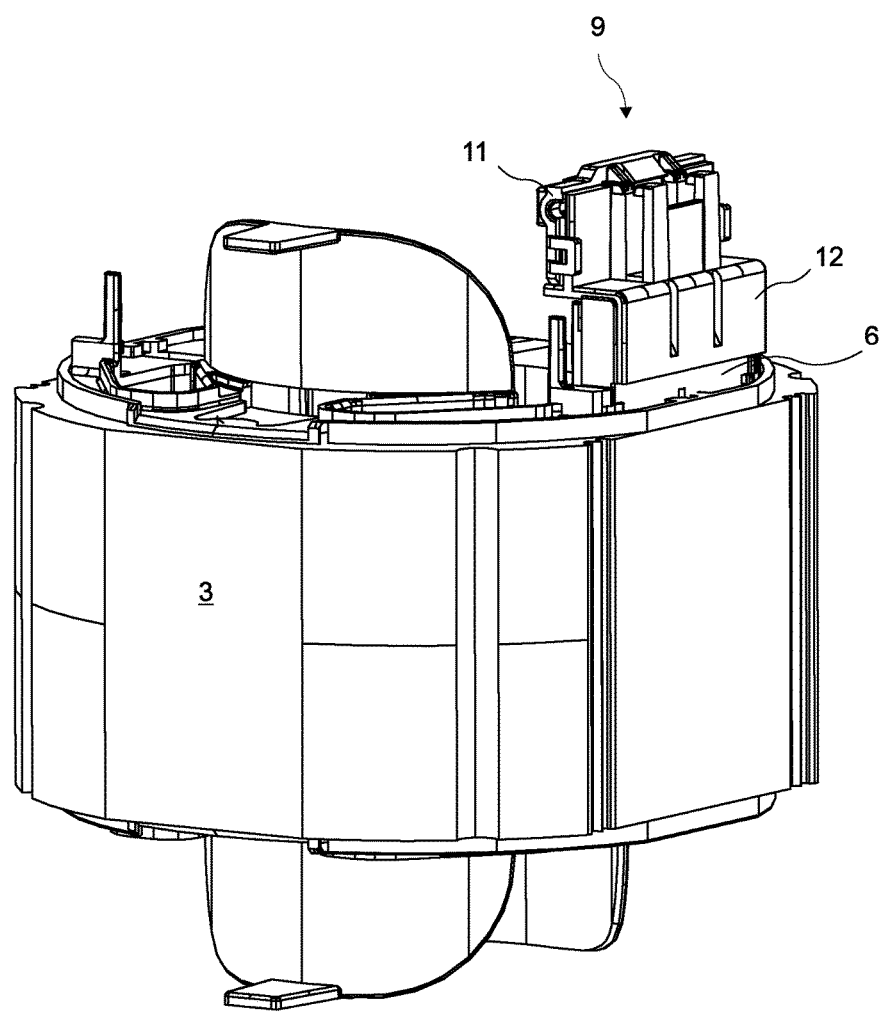

FIG. 2—is the perspective view of a stator.

Figure 3:
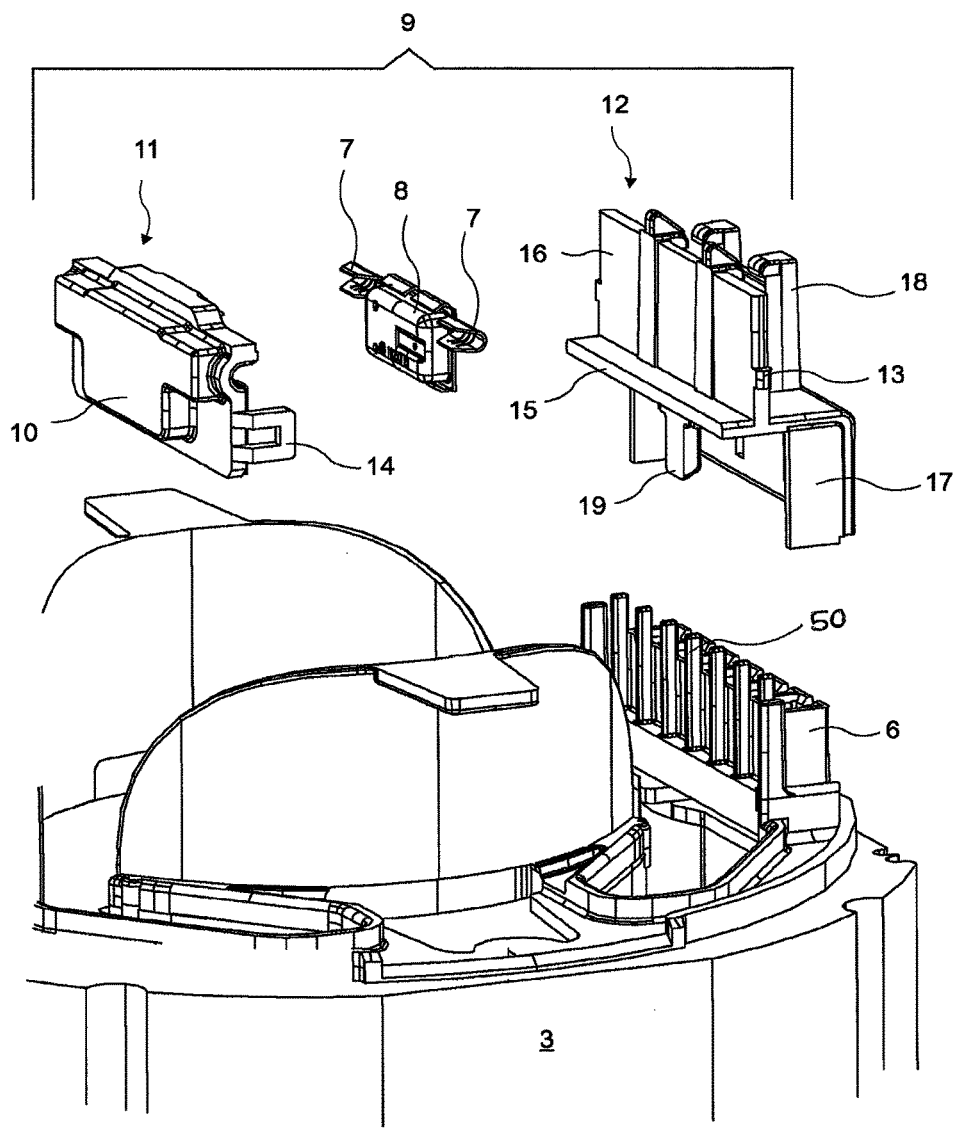

FIG. 3—is the exploded view of the thermal switch housing, the thermal switch and the connector situated on the stator.

Figure 4:
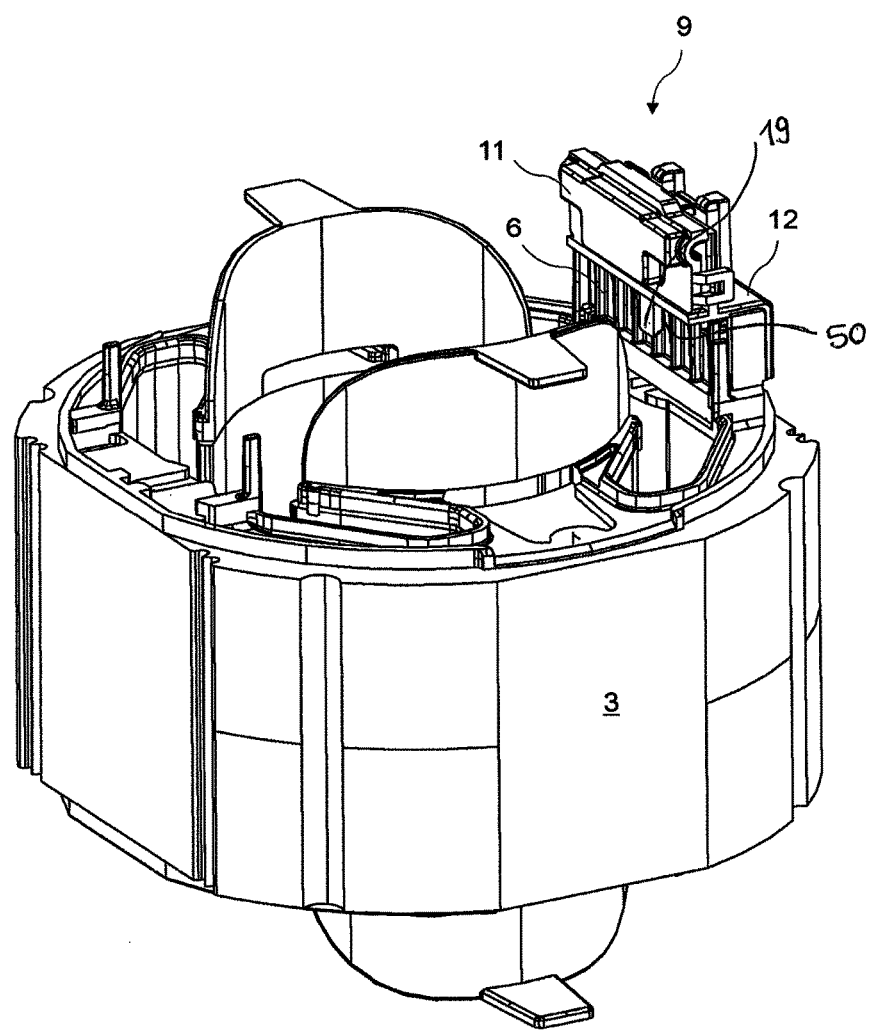

FIG. 4—is the perspective view of the stator from another angle.

Figure 5:
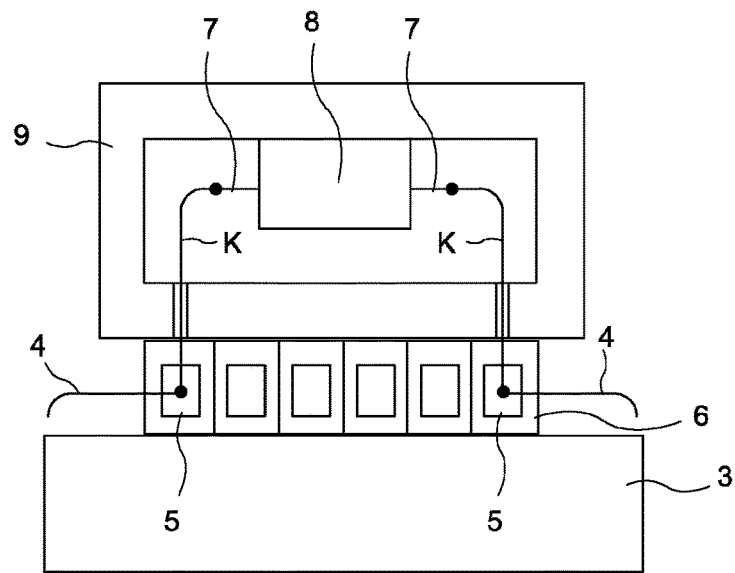

FIG. 5—is the schematic view of the thermal switch housing, the thermal switch and the connector situated on the stator in an embodiment of the present invention.

Figure 6:
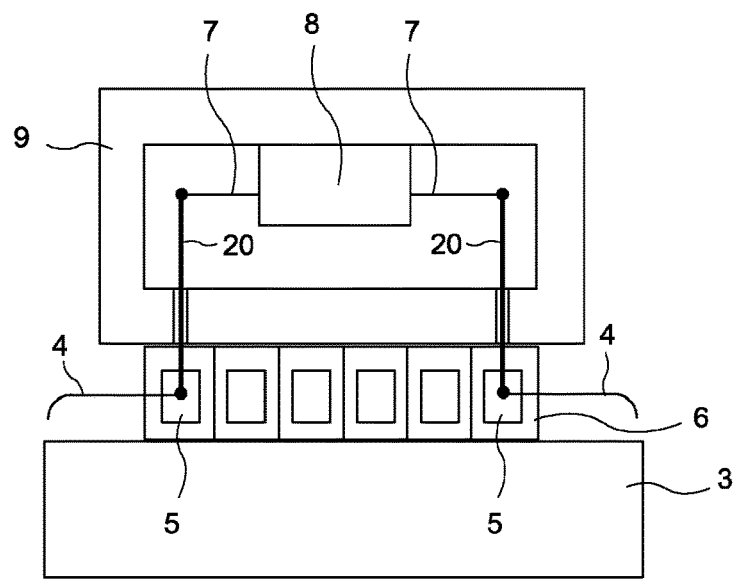

FIG. 6—is the schematic view of the thermal switch housing, the thermal switch and the connector situated on the stator in another embodiment of the present invention.

Figure 7:
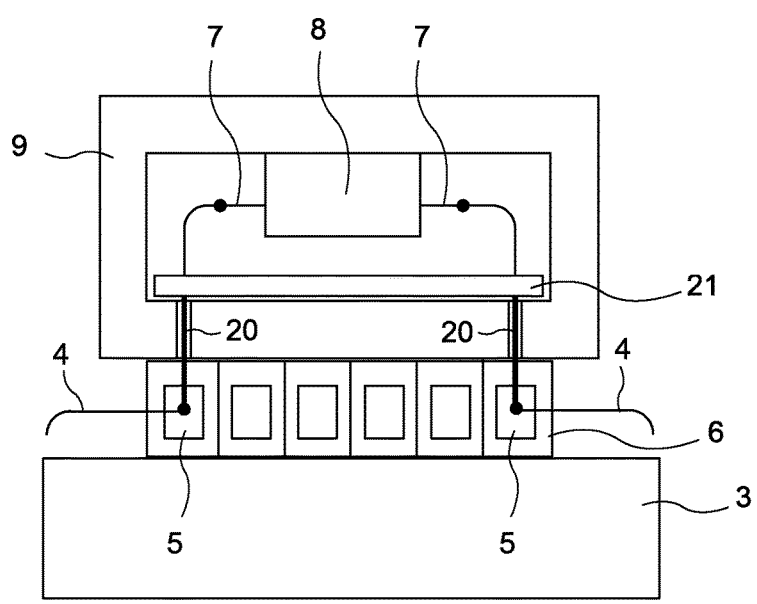

FIG. 7—is the schematic view of the thermal switch housing, the thermal switch and the connector situated on the stator in yet another embodiment of the present invention.

The elements illustrated in the figures are numbered as follows:
1. Electric motor
2. Rotor
3. Stator
4. Winding
5. Terminal
6. Connector
7. Connection end
8. Thermal switch
9. Housing
10. Receptacle
11. First part
12. Second part
13. Claw
14. Retainer
15. Supporting wall
16. Support wall
17. Skirt
18. Cable retainer 19. Lower support extension
20. Pin
21. Printed circuit board The electric motor (1) used in household appliances such as washing machines comprises a rotor (2), a stator (3) that provides the rotor (2) to be rotated by applying magnetic field, more than one winding (4) the diameter and coil number of which are determined according to the desired power and the number of revolutions, more than one terminal (5) of preferably mag-mate type to which the winding (4) ends are connected, a connector (6) produced from plastic material wherein the terminals (5) are situated, fixed on the stator (3) and which provides the electrical connection between the windings (4) and the external power source, and a thermal switch (8) connected in series to the windings (4), which cuts off the electric current passing therethrough and stops the operation of the electric motor (1) by detecting the increase in the current that occurs due to reasons such as excessive load and mains voltage variability and which has two connection ends (7) that provides the connection between the thermal switch (8) and the windings (4). The thermal switch (8) is of self heating type and a resistance (not shown in the figures) is disposed in the thermal switch (8), which provides the bimetal contact ends to be separated and the electric current to be cut off by heating up when the current rises.

The electric motor (1) of the present invention comprises a housing (9) produced from heat insulating material, preferably plastic, situated on the connector (6) and which encapsulates the thermal switch (8).

By being situated on the connector (6), the housing (9) of the present invention provides the thermal switch (8) to be positioned on the stator (3) at a distance as much as at least the height (H) of the connector (6) and thus provides the thermal switch (8) not to be affected by the magnetic field generated in the stator (3). The housing (9) provides thermal insulation by encapsulating the thermal switch (8) and prevents the thermal switch (8) from being subjected to hot air circulation that occurs during the operation of the rotor (2). The housing (9) forms a barrier between the thermal switch (8) and the windings (4) and prevents the heat emitted from the windings (4) from reaching the thermal switch (8). Thus, the thermal switch (8) is not affected by the winding (4) temperature and the magnetic field generated in the stator (3), is responsible only for the overcurrent and is prevented from stopping the electric motor (1) unnecessarily.

In an embodiment of the present invention, the housing (9) is produced as two pieces and comprises a first part (11) that has a receptacle (10) wherein the thermal switch (8) is situated so as not to move and a second part (12) that is seated on the connector (6) and whereon the first part (11) is mounted (FIG. 3).

In an embodiment of the present invention, the first part (11) and the second part (12) are joined by the snap-fitting method. The housing (9) comprises one or more than one claw (13) disposed on the first part (11) or the second part (12) and one or more than one retainer (14) wherein the claws (13) are fitted (FIG. 2, FIG. 3, FIG. 4).

The second part (12) carries the first part (11) wherein the thermal switch is situated (8), and at the same time, protects the terminals (5) from outside environment effects such as humidity, dust etc. by covering the connector (6).

The housing (9) comprises a horizontal supporting wall (15) on the second part (12), seated on the connector (6) and whereon the first part (11) is situated, a support wall (16) at the upper portion of the supporting wall (15), perpendicular to the supporting wall (15), a skirt (17) under the supporting wall (15), encapsulating the connector (6), a cable retainer (18) that holds together the cables connected to the connector (6) and a lower support extension (19) that bears against the inner surface (50) of the connector (6) that faces the windings (4) by extending from the supporting wall (15) downwards (FIG. 3).

In another embodiment of the present invention, the connection ends (7) of the thermal switch (8) and the winding (4) ends are joined by means of the terminals (5) disposed in the connector (6) (FIG. 1, FIG. 5, FIG. 6, FIG. 7).

In another embodiment of the present invention, the connection ends (7) are disposed on both sides of the thermal switch (8) and are joined with the winding (4) ends by means of the terminals (5) disposed on both ends of the connector (6). Thus, the lengths of the cables (K) that provide the connection of the thermal switch (8) to the winding (4) ends are shortened and the cables (K) are prevented from occupying space on the electric motor (1). In this embodiment, the housing (9) has a T-shaped receptacle (10) that bears the thermal switch (8) and the connection ends (7).

In another embodiment of the present invention, the cables (K) that connect the thermal switch (8) connection ends (7) to the terminals (5) are concealed by being passed through the housing (9) and connected to the connector (6) terminals (5) under the housing (9) and thus are not seen from the outside (FIG. 5).

In another embodiment of the present invention, the electric motor (1) comprises two pins (20) that provide the connection between the thermal switch (8) connection ends (7) and the terminals (5) by being passed through the housing (9) (FIG. 6).

In another embodiment of the present invention, the electric motor (1) comprises a printed circuit board (PCB) (21) situated in the housing (9), to one side of which the connection ends (7) and to the other side of which the pins (20) extending from the terminals (5) are connected, and which provides the electrical connection between the connection ends (7) and the terminals (5) by means of the conductive lines therein (FIG. 7).

In another embodiment of the present invention, the housing (9) is produced as a single piece by being coated on the thermal switch (8) by the plastic injection method.

In the electric motor (1) of the present invention, thermal insulation is provided by situating the thermal switch (8) in a plastic housing (9) and the thermal switch (8) is prevented from being affected by the magnetic field formed in the stator (3) by being situated on the connector (6) and thus being moved away from the stator (3) as much as at least the height (H) of the connector (6). The thermal switch (8) is prevented from unnecessarily stopping the electric motor (1) by the effect of temperature and magnetic field.

It is to be understood that the present invention is not limited by the embodiments disclosed above and a person skilled in the art can easily introduce different embodiments. These should be considered within the scope of the protection disclosed by the claims of the present invention.

The invention claimed is:
1. An electric motor (1) comprising:
   a rotor (2),
   a stator (3),
   more than one winding (4),
   more than one terminal (5) whereto winding (4) ends are connected,
   a connector (6) fixed on the stator (3), wherein the terminals (5) are situated, and a thermal switch (8) having two connection ends (7) providing the thermal switch (8) to be connected in series to the windings (4), a housing (9) produced from heat insulating material, including a first part (11) and a second part (12) encapsulating the thermal switch (8), wherein the housing is situated on the connector (6) such that the thermal switch is provided above the connector and at a predetermined distance from the stator, wherein the second part includes a skirt extending from a bottom surface of the housing below the thermal switch and over the connector to cover an external surface of the connector and to encapsulate the more than one terminal (5).

2. The electric motor (1) as in claim 1, wherein the connection ends (7) of the thermal switch are joined with the winding (4) ends by means of the terminals (5) disposed in the connector (6).

3. The electric motor (1) as in claim 1, further comprising cables (K) that connect the connection ends (7) to the terminals (5) and that are concealed by being passed through the housing (9).

4. The electric motor (1) as in claim 1, further comprising two pins (20) that provide the connection ends (7) to be connected to the terminals (5) by being passed through the housing (9).

5. The electric motor (1) as in claim 1, further comprising a printed circuit board (21) situated in the housing (9) and providing the electrical connection between the connection ends (7) and the terminals (5).

6. The electric motor (1) as in claim 1, wherein the predetermined distance is as much as at least the height of the connector.

7. The electric motor (1) as in claim 1, wherein the first part (11) has a receptacle (10) wherein the thermal switch (8) is situated, the second part (12) is seated on the connector (6), and the first part (11) is mounted on the second part.

8. The electric motor (1) as in claim 7, wherein the housing (9) comprises a horizontal supporting wall (15) disposed in the second part (12), whereon the first part (11) is situated, a vertical support wall (16) perpendicular to the horizontal supporting wall (15), a cable retainer (18) and a lower support extension (19) that bears against the inner surface of the connector (6) that faces the windings (4), wherein the horizontal supporting wall forms at least a portion of the bottom surface of the housing.

9. The electric motor (1) as in claim 1, wherein the connection ends (7) are disposed on both sides of the thermal switch (8), and the connection ends (7) are joined with the winding (4) ends by means of the terminals (5) disposed at both ends of the connector (6).

10. The electric motor (1) as in claim 9, wherein the housing (9) has a T-shaped receptacle (10) that bears the thermal switch (8) and the connection ends (7).

11. The electric motor (1) as in claim 1, wherein the housing (9) comprises a horizontal supporting wall (15) disposed in the second part (12), whereon the first part (11) is situated, a vertical support wall (16) perpendicular to the horizontal supporting wall (15), a cable retainer (18) and a lower support extension (19) that bears against an inner surface of the connector (6) that faces the windings (4), wherein the horizontal supporting wall forms at least a portion of the bottom surface of the housing.

12. The electric motor (1) as in claim 11, wherein the connection ends (7) of the thermal switch (8) are joined with the winding (4) ends by means of the terminals (5) disposed in the connector (6).

13. The electric motor (1) as in claim 12, wherein the connection ends (7) are disposed on both sides of the thermal switch (8), and the connection ends (7) are joined with the winding (4) ends by means of the terminals (5) disposed at both ends of the connector (6).

14. The electric motor (1) as in claim 13, wherein the housing (9) has a T-shaped receptacle (10) that bears the thermal switch (8) and the connection ends (7).

15. The electric motor (1) as in claim 14, further comprising cables (K) that connect the connection ends (7) to the terminals (5) and that are concealed by being passed through the housing (9).

16. The electric motor (1) as in claim 14, further comprising two pins (20) that provide the connection ends (7) to be connected to the terminals (5) by being passed through the housing (9).

17. The electric motor (1) as in claim 16, further comprising a printed circuit board (21) situated in the housing (9) and providing an electrical connection between the connection ends (7) and the terminals (5).

18. An electric motor comprising:
a rotor,
a stator,
more than one winding,
more than one terminal whereto winding ends are connected,
a connector fixed on the stator, wherein the terminals are situated, and
a thermal switch having two connection ends providing the thermal switch to be connected in series to the windings,
a housing produced from heat insulating material, including a first part and a second part encapsulating the thermal switch, wherein the housing includes a wall parallel to a top surface of the stator such that the thermal switch is provided within a receptacle above the wall, the connector is provided in a portion of the housing below the wall and at a predetermined distance from the stator, wherein the second part includes a skirt extending over the connector to cover an external surface of the connector and to encapsulate the more than one terminal, such that the thermal switch is separated from the portion of the housing by the wall.

* * * * *